United States Patent [19]

Spencer

[11] 3,839,704

[45] Oct. 1, 1974

[54] CONTROL FOR CHANNEL ACCESS TO STORAGE HIERARCHY SYSTEM

[75] Inventor: Dana R. Spencer, Wappingers Falls, N.Y.

[73] Assignee: International Business Machines Corporation, Armonk, N.Y.

[22] Filed: Dec. 6, 1972

[21] Appl. No.: 312,551

[52] U.S. Cl. .......... 340/172.5

[51] Int. Cl. .......... G06f 13/00

[58] Field of Search .......... 340/172.5

[56] References Cited

UNITED STATES PATENTS

| | | | |
|---|---|---|---|
| 3,533,075 | 10/1970 | Johnson et al. | 340/172.5 |
| 3,569,938 | 3/1971 | Eden et al. | 340/172.5 |
| 3,647,348 | 3/1972 | Smith et al. | 340/172.5 |
| 3,670,309 | 6/1972 | Amdahl et al. | 340/172.5 |
| 3,675,215 | 7/1972 | Arnold et al. | 340/172.5 |
| 3,693,165 | 9/1972 | Reiley et al. | 340/172.5 |

*Primary Examiner*—Gareth D. Shaw
*Assistant Examiner*—Melvin B. Chapnick
*Attorney, Agent, or Firm*—William S. Robertson

[57] ABSTRACT

In a storage hierarchy system in which a limited number of blocks of data in a backing store are held in a smaller buffer store, channel requests for access to storage are made to the buffer store. A circuit monitors the channel requests to the buffer store and detects various conditions that indicate that the channel may make a forthcoming request to a block that is held in the backing store but not in the buffer store. When such a request is detected, the circuit produces a dummy request to transfer the block to the buffer store before the actual channel request to this block. The invention reduces the average access time to the store and it reduces the likelihood of a condition called channel overrun that may occur when buffer storage space is not available when requested by the channel.

5 Claims, 2 Drawing Figures

CONTROL FOR CHANNEL ACCESS TO STORAGE HIERARCHY SYSTEM

RELATED APPLICATIONS

Application Ser. No. 174,831 of W. F. Beausoleil and B. E. Phelps for "Hierarchical Memory With Dedicated High Speed Buffers," now abandoned, relates to a system for channel access to a storage hierarchy and has background material that supplements this specification.

BACKGROUND OF THE INVENTION

In a storage hierarchy, a large, relatively slow, backing store holds a relatively large number of blocks of storage locations and a smaller, faster, buffer store holds a smaller number of blocks of storage locations. When the data blocks that are actually used are located in the buffer store, the storage system appears to have the speed of the faster buffer memory and the capacity of the larger backing store. Typically, a high portion of storage accesses are in fact made to a small portion of the storage locations so that such a system has a large number of high speed buffer operations and a smaller number of operations on storage locations held in the backing store or operations to transfer blocks between the two stores.

A channel is a logic and storage device that transfers data between the storage system and I/O devices such as disks and tapes. In a system having a storage hierarchy, it would be desirable to transfer data between the channel and the buffer store rather than between the channel and the backing store. However, with mechanical devices such as tapes and disks, the storage space must be available to the channel when the device is ready to read or write, and if the storage space is not available, an undesirable condition called an "overrun" occurs. A general object of this invention is to provide a circuit for transferring blocks of storage locations to the buffer store before the channel makes an actual request for the location.

THE INVENTION

According to this invention, means is provided in a data processing system for monitoring channel operations to detect certain operations that will probably be followed by a request to a known address location in the storage system. When such a situation is detected, a dummy request is made to this location. The control circuits for the store then transfer the addressed block from the backing store to the buffer store if the block is not already in the buffer store. The operations that are detected by the circuit of this invention are chosen so that a high portion of the dummy requests will in fact be followed by an actual channel request to the same address location and so that the actual request will occur at a time sufficiently later to permit a useful dummy request but not so late that a block that is transferred to the buffer store is likely to be removed from the buffer store by intervening requests to the storage system.

More specifically, means is provided to detect I/O requests for control words that may contain addresses of storage locations that the channel is to use for some subsequent operation. For example, in the system that will be described in detail later, a channel program is made up of channel command words that include assigned bit locations identifying a main storage address location that holds additional information that is required for the channel command operation. In the normal channel operation, the channel would fetch a next channel command word and subsequently fetch a word at the address defined in the channel command word. The apparatus of this invention produces a dummy request to the address defined in the channel command word and thereby prefetches this block from the backing store. Similarly, in the system to be described in detail, the address of the first channel command word of the channel program is stored in a channel address word and the channel operation of fetching the channel address word is followed by the operation of fetching the first channel command word of the channel program. The apparatus of this invention takes the channel command word address from the channel address word and produces a dummy request that brings the corresponding block into the buffer store.

Channel accesses to main store are commonly made to sequential address locations, and this invention provides means for detecting a channel access to the last addressable location of a block. The apparatus of this invention then increments the block address and produces a dummy request to the next block. This request brings into the buffer store a block of storage that is likely to be addressed on a forthcoming channel operation.

As specific examples will show later, some of the dummy requests may be extraneous. The number of such non-useful requests is arranged to be quite small. In addition, the invention provides means that operates during a dummy request to inhibit the buffer memory cycle that accompanies the normal operation of transferring an addressed block from the backing store to the buffer store. With this feature, the apparatus of this invention is able to use less of the memory cycle time for prefetching an addressed block.

The invention is useful with storage hierarchy systems having various components and various modes of operating the hierarchy and in a system having more than two levels of storage in the hierarchy, the channel can be connected at any higher level of the hierarchy. The following description of the apparatus of the drawing will suggest other features and advantages of the invention.

THE DRAWING

THE EMBODIMENT OF THE DRAWING

Figure 1:
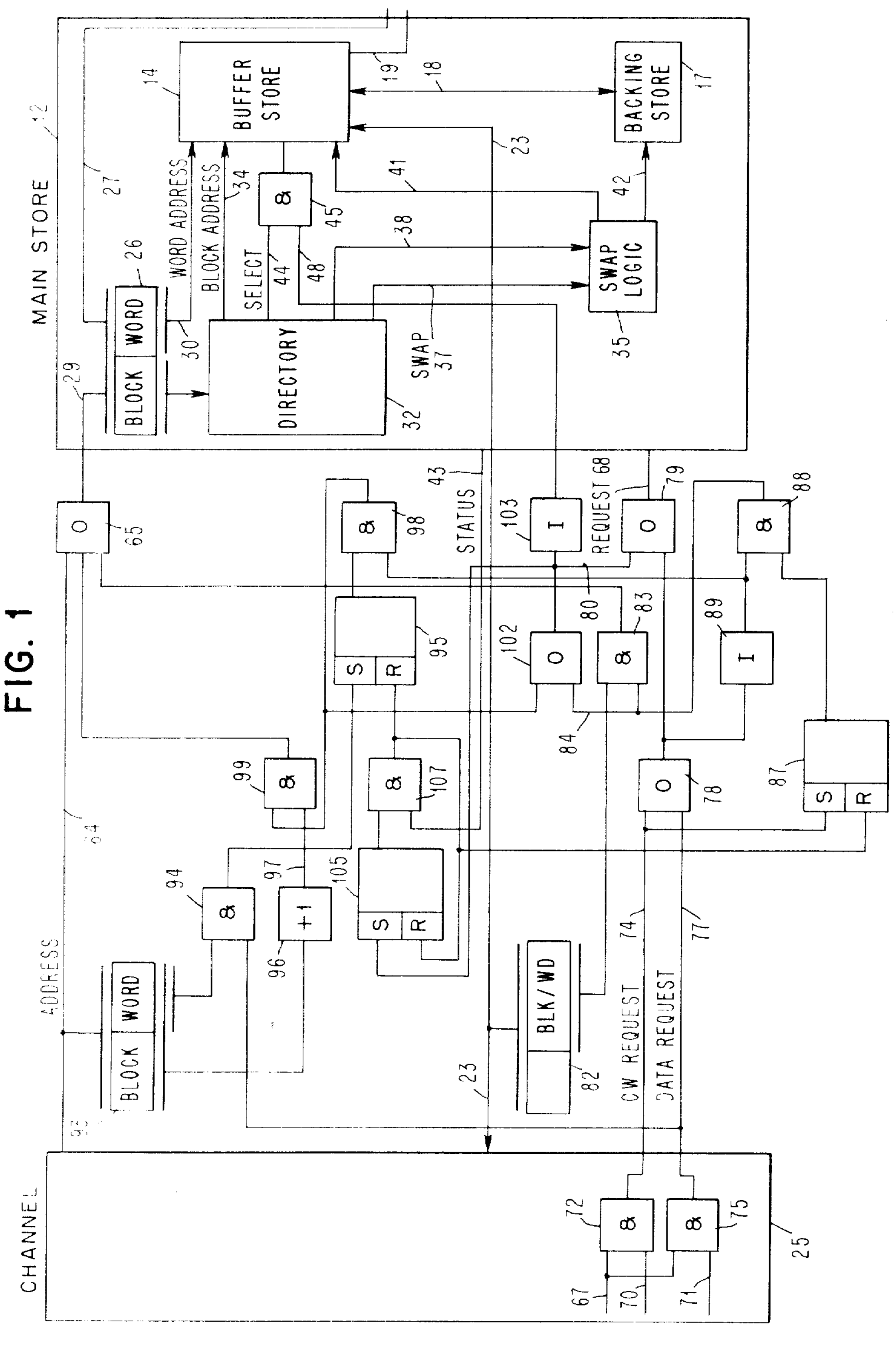
FIG. 1 shows the circuit of this invention and associated components of a data processing system.

Introduction — FIG. 1

FIG. 1 shows a main storage system 12 having a buffer store 14 and a backing store 17. Backing store 17 is substantially larger than buffer store 14 and data is transferred between the stores in a unit called a "block" on a system of conductors represented by a line 18. A line 19 carries data between buffer 14 and a CPU (not shown) and a line 23 carries data between buffer store 14 and a channel 25. Storage system 12 has an address register 26 and receives addresses from the CPU on a line 27 and from channel 25 on a line 29.

The high order address bits in register 26 define a block of storage locations in backing store 17 and the low order bits define a particular word within a block. A block has the same size in either buffer store 14 or backing store 17 and the word portion of address register 26 is valid for either store 14 or 17. The word portion of address register 26 is supplied directly to the buffer store addressing circuits on a line 30. By contrast, there are fewer blocks in buffer store 14 than in backing store 17 and a new block address is assigned when a block of data is transferred from a block location in store 17 to a block location in store 14. For each block of data in buffer 14, a directory 32 stores the block address that identifies the location of the data in backing store 17. In response to the block address from register 26, directory 32 supplies the appropriate block address to buffer 14 on a line 34. If the addressed block of data is not in buffer 14, directory 32 and a logic circuit 35 cooperate to swap one of the data blocks in buffer 14 for the addressed block in backing store 17. Directory 32 produces a signal "Swap" on a line 37 to start the swap operation and it supplies on a line 38 the block addresses that are necessary for the swap. Swap logic circuit 35 supplies addresses to buffer store 14 on a line 41 to identify the block location of the data block that is being replaced and it supplies addresses to backing store 17 on a line 42 to address first the block location that is to receive a block of data from buffer store 14 and next the block location that is to transfer a block of data to buffer store 14. Main storage system 12 also provides various status signals to the channel, including a signal on a line 43 that will be described later.

The components of main storage system 12 that have been described so far are conventional and illustrate a variety of storage hierarchy systems. In addition to these components, directory 32 provides a conventional signal, Select, on a line 44 that causes buffer 14 to respond to the address on lines 30, 34 to undergo a read or write operation. According to this invention, an AND gate 45 is connected to control transmitting the signal Select from directory 32 to buffer 14 according to the signal on an input line 48, as will be described later.

Figure 2:
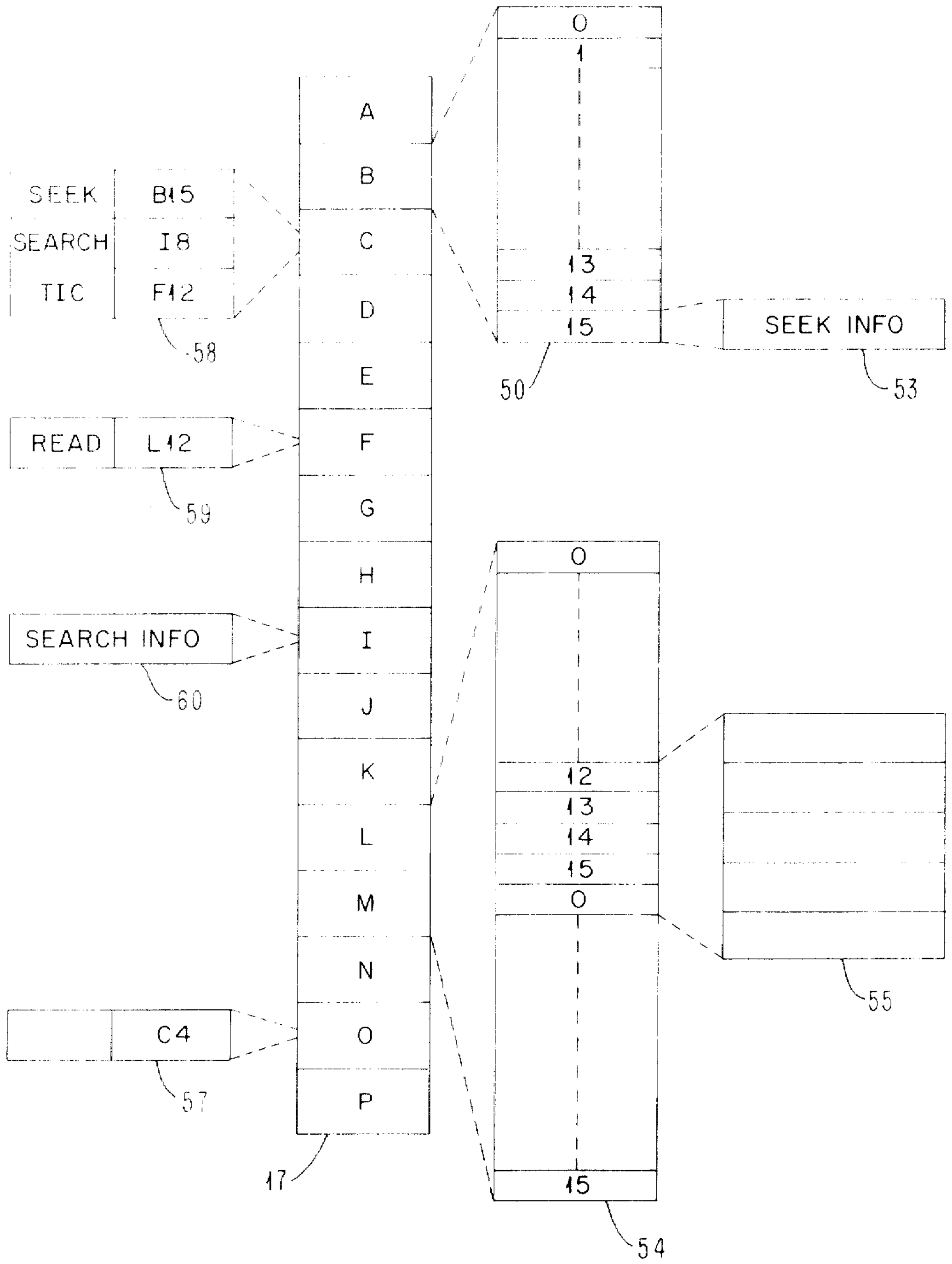
FIG. 2 shows the data organization of a backing store as an example of the operation of the circuit of FIG. 1.

Introduction — FIG. 2

FIG. 2 shows an organization of data in backing store 17 for a typical channel operation. Backing store 17 is shown as a column of blocks that are identified by letters A through P. In this example, each block contains 16 channel addressable units and an array 50 in the drawing is an expansion of block B and shows the individual channel accessible units and their addresses. Channel accessible unit 15 of block B is further expanded at 53 to show the data at this location that is significant in an example that will be described later. Similarly, an array 54 is an expansion of blocks L and M and array 55 is an expansion of some of the channel accessible units of these blocks. Arrays 57, 58, 59 and 60 are expansions of particular channel accessible units in blocks O, C, F, and I.

As already explained, a "block" is the smallest unit of data that is transferable from backing store 17 to buffer store 14 and each block begins at a high order address that appears in the Block portion of address register 26. A storage cycle of buffer 14 operates on a unit of data called a word, as already introduced in the description of the word section of address register 26.

A storage word may be made up of one or several multi-bit data units called bytes, and circuits associated with buffer 14 or other components of the data processing system may address individual bytes within a memory word. A "channel accessible unit" is a data unit of one or more bytes that is transferred on line 23 for an operation involving the channel and the storage system. Since the techniques are well developed in the storage art for adapting a store of a particular word size to a channel and other device of a differing word size, it will be convenient to consider only a specific example of FIG. 2 in which the channel accessible unit and the storage word are each 32 bits.

In the example of FIG. 2, a channel program represented by arrays 58 and 59 has been stored at locations 4, 5, and 6 in Block C and at location 12 in Block F. A channel address word is stored at a particular location, arbitrarily O5, that the channel addresses to begin the operation. Arrays 53 and 60 represent storage locations that hold other information that is to be used for the channel operation, and array 55 represents storage locations where data produced during the I/O operation is to be written. As already explained, in the storage hierarchy system 12 of FIG. 1, a block is transferred from the backing store 17 represented in FIG. 2 to buffer store 14 for an operation on any unit of data in the block.

In the beginning of the operation illustrated by FIG. 2, the channel fetches the channel address word from address O5. Bit positions 8 through 31 of the channel address word holds the address, C 4, of the first channel command word of the channel program. Bits 0 through 7 of the channel command word identify the operation, Seek, that the channel is to perform, and bit positions 8 through 31 hold an address, B15, that holds information that is to be used on the Seek operation. The channel then makes a storage request to fetch location 15 of block B. The next channel command word, Search, contains an address I8, that identifies a storage location holding information for controlling the search operation. The next channel command word has a command called Transfer In Channel and its address location identifies storage location F12 where the sequence of channel command words continues. The channel command word at this address calls for a read operation and its address portion identifies a series of addresses beginning at L12 where data read by the I/O device is to be stored. As will be described next, the circuit of this invention operates to transfer data from backing store 12 to buffer store 14 before the corresponding channel request occurs.

The Circuit of FIG. 1

For a memory accessing operation, channel 25 provides a multi-bit address on a line 64 that is transmitted through a set of gates represented by an OR gate 65 to form the address signal on line 29 which has already been introduced. Channel 25 also produces a conventional signal Request on a line 67 that is transmitted through intervening gates to a line 68 to cause storage system 12 to begin a read or write operation. Channel 25 also produces a signal on a line 70 when the request is for a channel address word or a channel command word and it produces the complement of this signal on a line 71 when the request is for data and not for a channel address word or channel command word. An AND gate 72 responds to signals on lines 67 and 70 to produce a signal CW Request (control word request)

on a line 74, and an AND gate 75 responds to signals from lines 67 and 71 to produce a signal Data Request on a line 77. OR gates 78 and 79 combine signals CW Request and Data Request (and an input 80 that will be described later) to form the signal Request on line 68. Thus, lines 74 and 77 identify whether the channel request on line 67 is for a channel address word or a channel command word shown in arrays 57, 58, and 59 in FIG. 2 or is a data request represented in FIG. 2 by storage arrays 53, 55, and 60.

A register 82 receives the data on line 23 and a set of AND gates 83 responds to an input on a line 84 to transfer the address portion of the data in register 82 to OR gates 65 to provide an address to the main store. A latch 87 is connected to be set in response to a signal CW Request on line 74, and an AND gate 88 is connected to energize input 84 of AND gate 83 in response to the coincidence of the set state of latch 87 and a signal at the output of an Invert circuit 89 that indicates the fall of the signal CW Request that sets latch 87. Thus, latch 87 provides means for detecting the occurrence of ā request for a channel address word or a channel command word and for storing an indication of this occurence until after the end of the request, and the output of gate 89 signifies that the request for the channel address word or channel command word has been completed and that a dummy request can be made to the address location defined in register 82.

A register 93 receives the channel address on line 64. An AND gate 94 responds to the coincidence of the signal Data Request on line 77 and all 1's in the word portion of register 93 (which addresses the last accessible unit of a block) to set a latch 95. A circuit 96 receives the address in register 93 and produces on a line 97 the address of the next higher block in register 93. Circuit 96 consists of a conventional binary adder and adds 1 to the low order bit position of the address in register 93 or equivalently adds 1 to the low order bit of the block address and sets the word portion of the address on line 97 to all 0's. An AND gate 98 and a set of AND gates 99 respond to the coincidence to the set state of latch 95 and the output of gate 89 which indicates the fall of the signal Data Request to transmit the address on line 97 to OR gates 65 and address 29. Thus, as the circuit has been described so far, a channel fetch operation for a control word or for the last addressable unit of a block produces an address on line 29 and sets either latch 87 or latch 95.

An OR gate 102 receives the output of AND gates 88 and 98 and produces a 1 logic level signal at the input 80 of OR gate 79 and thereby produces a dummy Request signal on line 68. An invert circuit 103 produces a 0 logic level signal on the line 48 during a dummy request. The dummy Request signal on line 68 causes main store 12 to respond to the address on line 29 (which originates at the output of circuit 96 or gates 83 for a dummy request). As for any other request to main store 12, tables in directory 32 are searched to find whether the block addressed in register 26 is in buffer store 14. If the addressed block of data is found to be in buffer store 14, directory 32 produces a Select signal on line 44. In a normal main store access, the buffer store responds to a Select signal by producing a read or write operation at the location defined by the address on lines 30 and 34, and the buffer produces a Busy signal that prevents access to the buffer by other units during the storage operation. The signal on line 48 permits this normal operation but it inhibits the Select signal during a dummy operation and thereby prevents the buffer from undergoing this storage cycle. If the block of data addressed by a dummy request is not in buffer store 14, the directory operation already described to transfer some block of data from buffer store 14 to its block location in store 17 (if there is no vacant block location in the buffer store) and to transfer the addressed block of data to the vacant block location in the buffer store.

There are various arrangements in storage hierarchies (discussed in the cited application) to permit the channel or CPU making a request to access a particular location in main store while transferring the associated block from the backing store to the buffer store. In the arrangement of the drawing, directory 32 and swap logic circuit 35 first cooperate to transfer a block of data to buffer store 14 and to then produce the signal Select on a line 44 to access the addressed word location in the buffer store. Thus, the signal on line 48 inhibits the additional read operation after a swap operation in the same way that has already been described for a dummy request which does not require a swap operation. In other hierarchy operations, the addressed word may be accessed before the block transfer and such an operation may be prevented by inhibiting a Select signal to backing store 17 in a way that is closely analogous to the circuit of the drawing. The addressed word may also be accessed as its address appears in the sequence of transferring each word of a block to the buffer store, and the block transfer time may be shortened by inhibiting any part of this operation that does not contribute to the block transfer.

Main store 12 produces various status signals during a storage cycle and during a block transfer operation and the signal Status on line 43 is selected to appear at a time when the signals on lines 29, 23 and 68 are no longer needed for the dummy request. More specifically, the signal Select on line 44 appears when the operation of directory 32 and any operation by swap logic circuit 35 have been completed and thus provides a suitable Status signal. A latch 105 is connected to be set by the output of OR gate 102 at the beginning of any dummy request. An AND gate 107 is connected to reset latches 87, 95, 105 on coincidence of the signal Status and the set state of latch 105. Thus, at the end of a dummy request, the circuit is ready for a further operation. Latch 105 prevents latches 87, 95 from being reset until the dummy request has been completed.

Operation

The circuit of FIG. 1 can also be understood by considering its operation in the channel program of FIG. 2. To begin this operation, channel 26 produces the address O5 on line 64 and signals on lines 67 and 70 that identify the operation as a request for a control word. OR gates 78 and 79 transmit the signal Request to line 68 at the input of store 12, and OR gates 65 transmit the address to input 29 of address register 26. The address also is loaded into address register 93 but since this operation is not a data request, line 77 has a 0 logic level and prevents gate 94 and the associated circuit from producing an address at the input of OR gates 65. The signal CW Request on line 74 sets latch 87 but the complement of this signal at the output of invert circuit 89 inhibits the circuits associated with latch 87 from producing an address at the input of OR gates 65. In response to this request, main store 12 sends channel 25 the channel addressed word 57. This word is also loaded into register 82 and the address C4 appears at the inputs to AND gates 83. At the end of this operation, the signal CW Request on line 74 falls and a signal rises at the output of invert circuit 89. The output of invert circuit 89 opens gate 88 and the output of gate 88 opens gates 83 to transmit the address C4 through OR gates 65 to register 26. The output of AND gate 88 also is transmitted through OR gates 102 and 79 to form the dummy signal Request on line 86. In response to the address C4 and the signal Request, main store 12 operates to transfer block C from the backing store to the buffer store if the buffer store does not already hold block C. At the end of this operation latch 87 is reset.

In the next operation of this program, channel 25 loads the address C4 on line 64 for the normal operation of fetching the first channel command word of the channel program. The operation described in the preceding paragraph gives a high assurance that the block C is in fact in the buffer store. Store 12 sends channel 25 on a line 23 the first channel command word which, as FIG. 2 shows at 58, contains tha address B15 where information is stored for the related channel operation. This channel command word is loaded in register 82 and produces an operation to load block B into the buffer store in a way that has already been described for loading block C into the buffer store in response to the address portion of channel address word 57.

In response to the first channel command word, the channel thereafter loads the address B15 on line 64 to fetch the information shown at 53 in FIG. 2. The channel also produces a signal Data Request on line 77. In this example, the last word of a block is addressed and in response to the signal on line 77 and the contents of the word portion of register 93, AND gate 94 opens and sets latch 95. When the signal Data Request falls, AND gate 98 and AND gates 99 open to produce the next higher address, C0 at input 29 to address register 26. AND gate 98 also produces the signal Request on line 68 and the inhibiting signal on line 48. In response to these signals, the main store operates to a dummy request to transfer block C to the buffer store if it is not already in the buffer store. The circuit is arranged to respond to a request to word location 15 in this way because requests are often made to a sequence of word locations and there is a good probability that a data request to word location B15 will be followed by a data request to word location C1. The example has been arranged to show that this is not always the case and as in this example, some dummy requests may be extraneous. The example also further illustrates the advantage of using the signal on line 48 to inhibit any aspect of a storage operation that is not actually needed for a dummy request. Thus, an extraneous dummy request will require the relatively high speed operation of directory 32 and it may or may not require the operation of swap logic circuit 35 depending on whether the extraneously requested block is in buffer store 14.

The channel then fetches the next channel command word and the circuit of this invention produces a dummy request at storage location I8. In this normal operation, channel 25 then fetches the data at storage location I8 and then the next channel command word. The next channel command word contains the address F12 and block F is transferred to buffer store 14 in a dummy request operation. The channel command word stored at location F12 contains an address, L12, that identifies the starting address of a group of word locations where the channel is to store data that is produced by the I/O operation. This group includes word locations 12 through 15 of block L and word location 0 of block M. In response to the address L12 in channel command word 59, the circuit loads block L into the buffer store but it does not operate on block M. As channel 25 enters data in these locations of buffer 14, it produces a sequence of addresses L12 through L15 on line 64. When address L15 appears on 64, the circuit responds in the way already described to produce a dummy request for location M0 so that block M is preloaded into buffer store 14 for the forthcoming channel access to this block.

Other Embodiments

The invention is useful with a wide variety of channels and storage hierarchy systems and counterparts will be readily recognized for the specific timing and status signals produced by the channel and storage system shown in the drawing. The channel program of the example of FIG. 2 is based on a publication entitled "IBM system/360 Principles of Operation," Form No. A22-6821-6, and related publications available from the assignee of this invention. The invention is readily adaptable to channel and storage systems that operate differently. From this description of the operation and the circuit of the preferred embodiment of the invention, those skilled in the art will recognize various changes and modification within the spirit of the invention and the scope of the claims.

What is claimed is:

1. In a data processing system having a buffer store, a backing store, means for controlling the transfer of blocks of data between said stores in response to an address directed to a data block in said backing store but not in said buffer store, and a channel connected to access said buffer store for fetching a control word and for data transfer operations, storage access control apparatus, comprising, means for identifying in a control word fetched by the channel from said buffer store, an address of a location to be accessed by the channel in the execution of the control word, and means responsive to said address for making a dummy request to the buffer store for initiating a transfer of the associated data block from the backing store to the buffer store.

2. The storage access control apparatus of claim 1 wherein, said means for identifying an address in a control word comprises means for producing a first signal identifying that a channel request is for a control word containing an address of a next storage location to be accessed by the channel and producing a second signal identifying that a channel request is for a data transfer operation, and said means for making a dummy request to the buffer store comprises means responsive to said first signal and to the address in said control word for making said dummy request.

3. The apparatus of claim 2 wherein the data processing system performs operations to bring an addressed block from the backing store to the buffer store and further operations to access the storage unit addressed by the channel and said apparatus further includes means for inhibiting said further operations during a dummy request.

4. The apparatus of claim 3 wherein said further operations by said data processing system include accessing said buffer store at the location of said address, and said means for inhibiting includes means to inhibit accessing said buffer store.

5. The apparatus of claim 3 wherein the channel operates according to a program made up of channel command words accessable from said buffer store and the address of a first of said channel command words is held in a channel address word accessable from said buffer store and said means for making a dummy request further includes means for storing the address in the channel address word and means responsive to the completion of the request for the channel address word for making a dummy request to the first of the channel command words.

* * * * *